(12) United States Patent
O'Reilly et al.

(10) Patent No.: US 12,164,961 B2
(45) Date of Patent: Dec. 10, 2024

(54) FAST ENERGY ACCOUNTING SYSTEM

(71) Applicant: Apple Inc., Cupertino, CA (US)

(72) Inventors: Conor J. O'Reilly, Los Gatos, CA (US); Arjun S. Vasudevan, Sunnyvale, CA (US); Gina B Lu, San Francisco, CA (US); Kartik R. Venkatraman, San Francisco, CA (US); Abhinav Pathak, Campbell, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 17/481,891

(22) Filed: Sep. 22, 2021

(65) Prior Publication Data

US 2023/0089593 A1   Mar. 23, 2023

(51) Int. Cl.
| | |
|---|---|
| *G06F 9/50* | (2006.01) |
| *G06F 1/3228* | (2019.01) |
| *G06N 20/00* | (2019.01) |
| *H02J 7/00* | (2006.01) |

(52) U.S. Cl.
CPC .......... *G06F 9/5005* (2013.01); *G06F 1/3228* (2013.01); *G06N 20/00* (2019.01); *H02J 7/0048* (2020.01)

(58) Field of Classification Search
None
See application file for complete search history.

(56) References Cited

U.S. PATENT DOCUMENTS

| | | | |
|---|---|---|---|
| 9,867,017 B1* | 1/2018 | Bacarella | H04W 4/029 |
| 2005/0125701 A1* | 6/2005 | Hensbergen | G06F 1/329 |
| | | | 713/320 |
| 2007/0245163 A1* | 10/2007 | Lu | G06F 1/3203 |
| | | | 713/300 |
| 2009/0094473 A1* | 4/2009 | Mizutani | G06F 1/3203 |
| | | | 713/340 |
| 2012/0210325 A1* | 8/2012 | de Lind van Wijngaarden | |
| | | | H04W 52/0258 |
| | | | 718/103 |
| 2014/0143579 A1* | 5/2014 | Grokop | G06F 9/4893 |
| | | | 713/340 |
| 2017/0344092 A1* | 11/2017 | Bluestein | G06F 1/3212 |
| 2019/0305383 A1* | 10/2019 | Muntes | H02J 7/0071 |
| 2019/0369705 A1* | 12/2019 | Pathak | G06F 1/3296 |
| 2019/0370141 A1* | 12/2019 | Choi | G06F 11/3075 |
| 2020/0034073 A1* | 1/2020 | Saha | G06F 3/067 |
| 2020/0201419 A1* | 6/2020 | Bikumala | G06N 20/10 |
| 2020/0387209 A1* | 12/2020 | Nicholas | G06F 1/3296 |
| 2021/0303056 A1* | 9/2021 | Peterson | G06F 1/324 |

FOREIGN PATENT DOCUMENTS

WO    WO 2019035665 A1 *  2/2019  .......... H04W 52/028

\* cited by examiner

*Primary Examiner* — Charles E Anya
(74) *Attorney, Agent, or Firm* — Fletcher Yoder P.C.

(57) ABSTRACT

This disclosure provide various techniques for decreasing the amount of energy consumed on an electronic device by one or more background processes. By implementing a fast energy accounting engine that may quickly detect changes in energy usage by the background processes and report the changes to a dynamic activity scheduler, a system may decrease the overall energy consumed by the one or more background processes.

20 Claims, 10 Drawing Sheets

FAST ENERGY ACCOUNTING SYSTEM

BACKGROUND

The disclosure relates generally to energy distribution in electronic devices, more particularly, energy distribution as it relates to background processes executing on the electronic devices. An electronic device may execute or run certain processes in the foreground (e.g., processes that a user is working on, processes that operate at least in part on a display of an electronic device, and the like) and other processes in the background (e.g., that are not visible or perceivable by the user, that do not operate at least in part on the display, and the like). To prevent background processes from consuming excess energy, the electronic device may have an energy budget allocated for running the background processes over a given time period (e.g., a day). The electronic device, specifically an operating system of the electronic device, may include a scheduler that schedules background processes.

The operating system of the electronic device may determine whether the background processes may run based on whether there is remaining energy in the energy budget. To determine whether the background process may or may not run, the scheduler may consult an energy accounting engine. The energy accounting engine may use a variety of models, telemetry engines, and/or parameters to determine the energy consumed by the background processes. The energy accounting engine may then report the energy consumed to the scheduler, which may allow the background processes to run if there is an energy budget surplus or may prevent the background processes from running if there is an energy budget deficit.

As previously stated, an operating system of an electronic device may allocate the energy budget for a set period of time (e.g., a day) that background processes running on the electronic device may share. The energy budget may be allocated at set intervals (e.g., every fifteen minutes) within the set period of time. For example, the operating system may allocate 280 milliwatt-hours (mWh) a day for use by the background processes and allocate that amount for use by clients running background processes every fifteen minutes over a 24-hour period. Accordingly, the clients may receive approximately 2.92 mWh to run background processes every 15 minutes throughout the day. For the scheduler to allow a client to run a background process, there must be enough energy in the budget to run the background process or, if there is not enough energy, the scheduler will prohibit the client from running the background process, and the client must wait until more energy is allocated.

Because of the various parameters taken into account by the energy accounting engine, the energy accounting engine may be accurate but slow. Because the energy accounting engine may be slow, it may not account for changes in the energy usage that have occurred recently relative to the energy accounting engine's feedback loop. For example, it may take the energy accounting engine one hour to determine the energy consumed by the background processes and report it to the scheduler. However, if the background processes have begun to consume a greater or lesser amount of energy more recently than the hour it may take the energy accounting system to determine and send an energy usage report (e.g., a new background process has begun consuming large amounts of energy within the last 15 minutes), the scheduler may not be able to react to the change until the energy accounting engine has had time to update the energy usage.

Indeed, some device subsystems (e.g., a baseband processor) may have a highly dynamic range of operating parameters that may result in significant differences in power consumption depending on environmental conditions, carrier conditions, and so on. For example, the energy expenditure of a 10-second long data transfer over a $5^{th}$ generation (5G) cellular network may differ greatly from the energy expenditure of a 10-second long data transfer over a $3^{rd}$ generation (3G) network or a $4^{th}$ generation (4G) network. Further, there may even be significant variation in the energy expenditure within the bands of a single network.

As such, the energy accounting engine may be less reliable for energy consumption changes that occur quickly, and thus the scheduler may be unable to respond to short-term changes that consume an excess amount of the energy budget, leading to greater power consumed by the background processes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, one or more tangible, non-transitory, computer-readable media, comprising computer-readable instructions that, upon execution by one or more processors of an electronic device, may cause the one or more processors to determine a first estimate of an amount of energy consumed by one or more background processes for a first time period using a first set of inputs, a first set of models, or both. The one or more processors may determine a second estimate of the amount of energy consumed by the one or more background processes for a second time period using a second set of inputs that are greater in number than the first set of inputs, a second set of models that are greater in number than the first set of models, or both. The one or more processors may determine an aggregate estimate of the amount of energy consumed by the one or more background processes based on the first estimate the second estimate; and may send the aggregate estimate to a dynamic activity scheduler.

In another embodiment, a software system may include one or more client applications configured to execute background processes on the software system. The software system may also include an operating system configured to execute the one or more client applications. The operating system may include an energy accounting system configured to determine energy usage of the background processes executed by the one or more client applications; and a dynamic activity scheduler configured to, based on the energy usage determined by the energy accounting system, allow the one or more client applications to execute the background processes or prevent the one or more client applications from executing the background processes.

In yet another embodiment, a method may include receiving a first estimate of an amount of energy consumed by one or more background processes for a first time period using a first set of inputs, a first set of models, or both; receiving a second estimate of the amount of energy consumed by the one or more background processes for the first time period using a second set of inputs that are lesser in number than the first set of inputs, a second set of models that are lesser in number than the first set of models, or both; and receiving a third estimate of the amount of energy consumed by the one or more background processes for a second time period starting from an end of the first time period using the second set of inputs. The method may include determining an aggregate estimate of the amount of energy consumed by the one or more background processes based on the first estimate, the second estimate, and the third estimate; and managing the one or more background processes based on the aggregate estimate.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

Embodiments herein provide various apparatuses and techniques to reduce excess power expenditure by implementing into an energy budgeting system an additional, faster energy accounting engine alongside an existing slower accounting engine. The fast energy accounting engine may provide energy consumption estimates more quickly (e.g., within a threshold of time less than that of the slower accounting engine, instantaneously, within one minute, within five minutes, within ten minutes, and so on). The fast energy accounting engine may determine energy usage faster by implementing fewer power models, factoring fewer inputs, and/or reducing or eliminating corrective procedures used by the slow energy accounting engine. For example, the fast energy accounting engine may only use power models for certain components that may be associated with high levels of energy usage by the background processes. For instance, the fast energy accounting system may only model the energy expended by a processor (e.g., a central processing unit or CPU) or the components used in communicating with a wireless network. In such a case, if the CPU model or network model indicate that a significant increase in energy usage is occurring due to a background process's use of the CPU or the network components, the fast energy accounting system may be able to react quickly enough to facilitate stopping the background processes from further consuming or additional backgrounds processes from starting to consume excess energy.

In any case, the fast energy accounting engine may generate a "fast" energy usage of the background processes, and the slow energy accounting engine may generate a "slow" energy usage of the background processes. An energy coalescing algorithm may then determine an accurate overall aggregate energy usage of the background processes based on the fast energy usage and the slow energy usage. By receiving an energy usage that is a combination of a more recent determination from the fast accounting engine and a more accurate determination that is less recent from the slow accounting engine, the energy budgeting system may benefit from the slow energy accounting engine's accuracy and the fast energy accounting engine's responsiveness.

Figure 1:
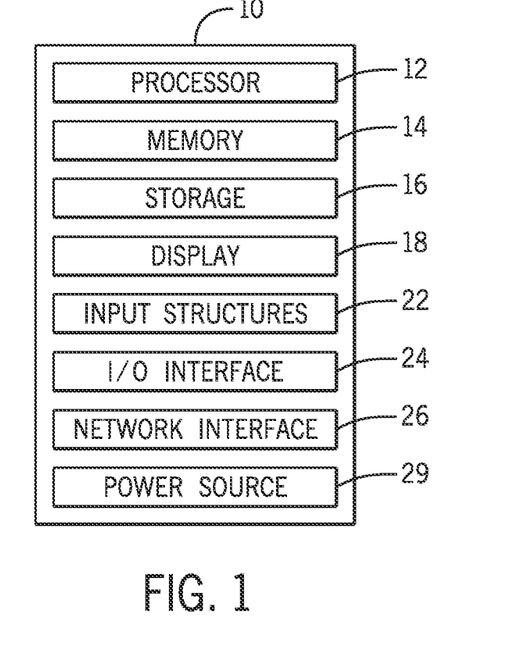
FIG. 1 is a block diagram of an electronic device, according to an embodiment of the present disclosure.

With the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FTC)), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the electronic device 10 may include any suitable source of power, such as a rechargeable lithium polymer (Li-poly) battery and/or an alternating current (AC) power converter.

Figure 2:
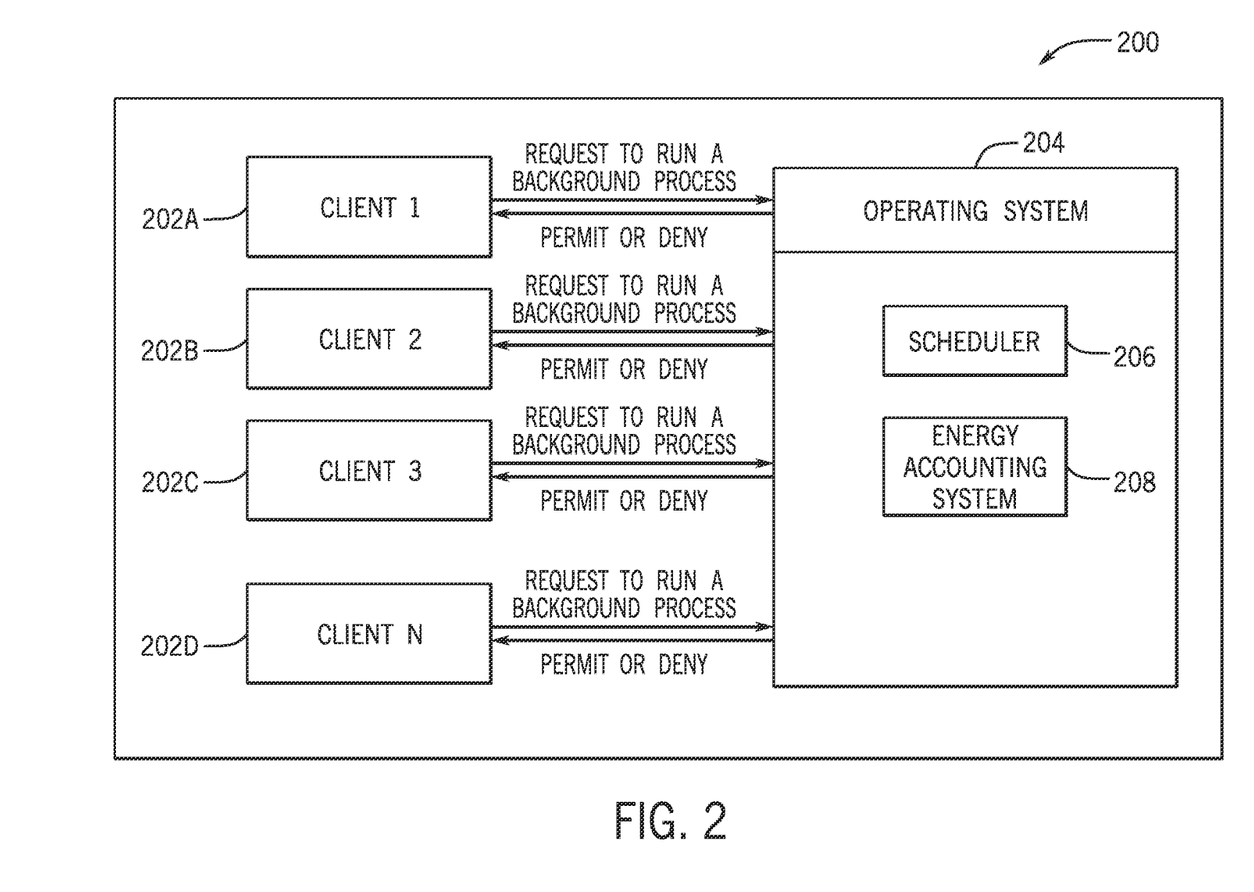
FIG. 2 is a schematic diagram of a software system of the electronic device that manages client execution, according to an embodiment of the present disclosure.

FIG. 2 is a block diagram of a software system 200 of the electronic device 10 that manages client execution, according to embodiments of the present disclosure. As illustrated, the software system 200 may include a number of clients 202, such as client 1 202A, client 2 202B, client 3 202C, and client N 202N. As used herein, "client" is defined as any entity that runs a background process or performs a background activity. A client 202 may be a third-party software application, a first-party software application, and so on. The clients 202 may perform tasks (e.g., run background processes) on the software system 200, when permitted by an operating system 204. The operating system 204 may include system software that manages computer hardware, software resources, and provides common services for computer programs. As illustrated, the operating system 204 may include a scheduler (e.g., a dynamic activity scheduler) 206 and an energy accounting system 208. The clients 202 may send a request to run a background process via the operating system 204 to the scheduler 206. Background processes are software programs that are non-user-facing (e.g., are not processes that a user is working on, do not appear on the display 18 of the electronic device 10, and the like) and may run without user intervention. Typical background processes perform tasks such as logging, system monitoring, scheduling, and user notification. For example, the client 1 202A may execute a background process that tracks the location of the electronic device 10, the client 2 202B may execute a background process that checks for and receives emails, and the client 3 202C may execute a background process that logs how much time the user of the electronic device 10 spends on certain software applications installed on the electronic device 10. The clients 202 may run simultaneously or sequentially. The clients 202 may each submit a request to run a particular background process.

The scheduler 206 may determine whether to permit or deny the requests of the clients 202 based on whether there is sufficient energy remaining in an energy budget allocated for running background processes on the operating system 204. Indeed, as used herein, "scheduling" is defined as determining whether the background processes may or may not run, and subsequently allowing the background process to run or preventing the background process from running. As previously stated, to prevent the clients 202 from consuming excess energy when running background processes, the operating system 204 may allocate an energy budget for a set period of time (e.g., one hour, one day, one week, and so on) that the background processes running on the electronic device 10 may share. The energy budget (e.g., 100 milliwatt-hours (mWh), 280 mWh, 500 mWh, and so on) may be allocated at set intervals (e.g., every five minutes, every fifteen minutes, every hour, and so on) within the set period of time. For example, the operating system 204 may allocate 280 mWh a day, and a modulator may allocate the 280 mWh over the course of the day in intervals of fifteen minutes. Accordingly, the system budget would receive approximately 2.92 mWh to run background processes every 15 minutes. The scheduler 206 may permit the request of the client 202 or allow an already-permitted client 202 to continue to run if there is a sufficient amount of energy in the energy budget. However, if there is not enough energy, the scheduler 206 may deny the request of the client 202 or, if the request has already been permitted, the scheduler 206 may cause the client 202 to defer running the background process until a later time (e.g., when more energy is allocated). The scheduler 206 may communicate with an energy accounting system 208 that may track of how much energy is consumed by the various clients 202. The disclosed systems and methods that enable the energy accounting system 208 to determine the energy consumed by the clients 202 will be discussed in greater detail below.

Figure 3:
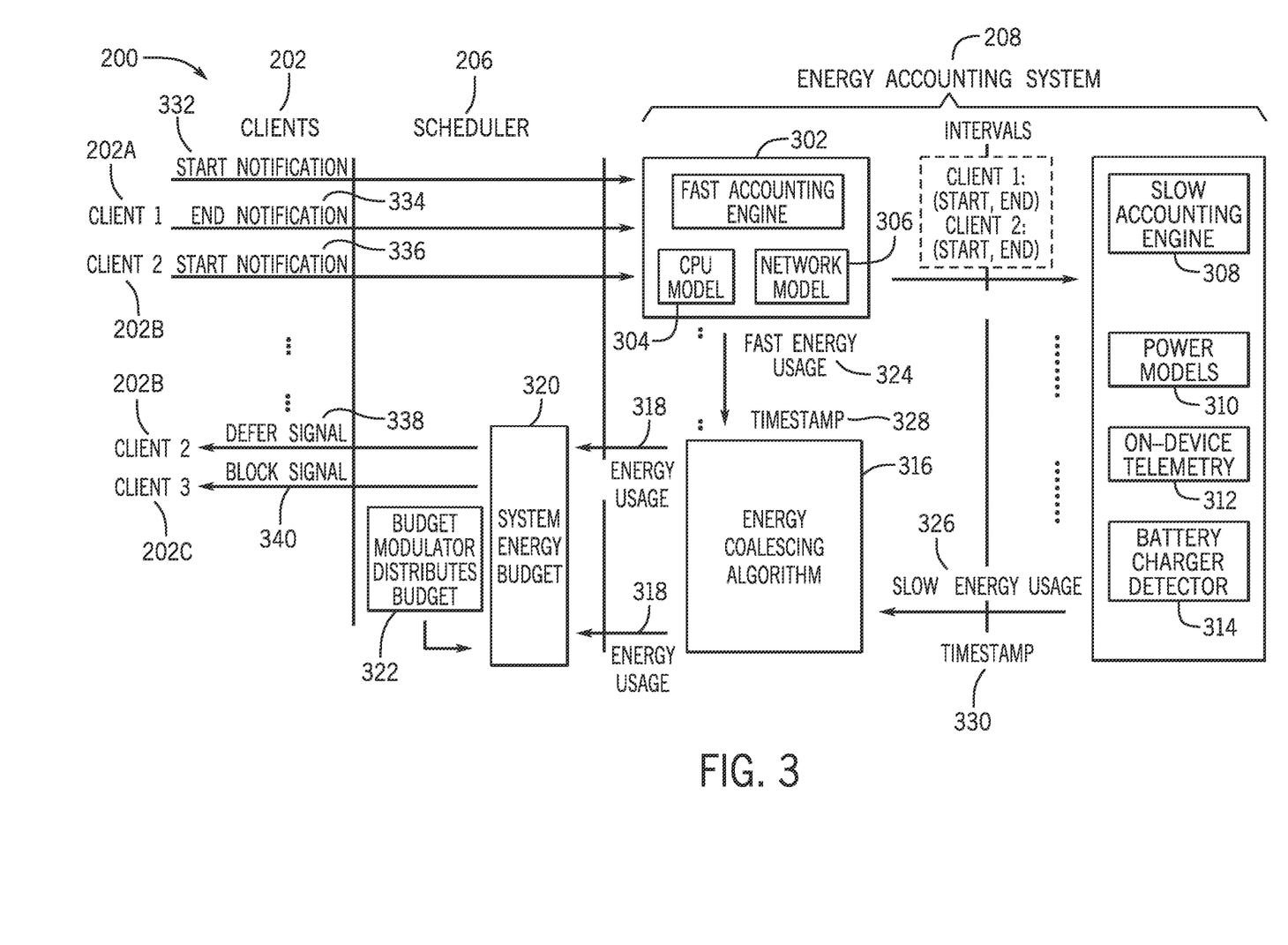
FIG. 3 is a more detailed schematic diagram of the software system of FIG. 2 that illustrates components of a scheduler and an energy accounting system, according to an embodiment of the present disclosure.

FIG. 3 is more detailed schematic diagram of the software system 200 that illustrates components of the scheduler 206 and the energy accounting system 208, according to embodiments of the present disclosure. As previously discussed, a client 202 (e.g., the client 1 202A, the client 2 202B, as shown in FIG. 2) may send a request to run a background process to the scheduler 206. If the scheduler 206 approves this request, the client 202 may send a start notification (e.g., 332, 336) to the scheduler 206 when the client 202 begins running a background process and send an end notification (e.g., 334) when the client 202 finishes running the background process. The scheduler 206 includes a budget modulator 322 that allocates the energy budget for use by the background processes (e.g., 2.92 mWh to run background processes every 15 minutes) to a system energy budget 320. The scheduler 206 may then determines the energy surplus or deficit based on the system energy budget 320 and energy used by the background processes as determined by the energy accounting system 208. The start notifications 332 and 336 and the end notification 334 may be passed from the scheduler 206 to the energy accounting system 208.

As illustrated, the energy accounting system 208 may include a fast accounting engine 302, a slow accounting engine 308, and an energy coalescing algorithm 316. The fast accounting engine 302 and the slow accounting engine 308 may determine the energy consumed by the various background processes run by the clients 202. The slow accounting engine 308 may use a combination of power models 310, on-device telemetry measurements 312, and/or comparison against various measurement devices (e.g., a battery charge state provided by a battery charge detector 314) to accurately model the energy usage of various components as a result of the background processes run by the clients 202. The power models 310 may model energy usage for all or a significant portion of the components on the electronic device 10, and as such may be based on a large number of inputs. The power models 310 may include subsystem-specific and/or component-specific models, such as a CPU model, a Wi-Fi model, a networking model, a display model, a GPS model, an audio model, and so on. The slow accounting engine 308 may receive inputs from the background processes, foreground processes, operating characteristics of components involved in background processes (e.g., the central processing unit (CPU) of the electronic device 10), and operating characteristics of components involved in foreground processes (e.g., the display 18).

The slow accounting engine 308 may also utilize on-device telemetry 312 to increase accuracy of slow energy usage 326. The slow energy usage 326 may include an accounting of the energy usage of the background processes determined by the slow accounting engine 308 based on the power models 310, the on-device telemetry 312, and the correction against the battery charge state provided by the battery charge detector 314, among other considerations. On-device telemetry 312 may include monitoring measurements or operating characteristics of various components on the electronic device 10 and using those measurements or operating characteristics to improve and/or correct the slow energy usage 326. Using the on-device telemetry 312, the slow accounting engine 308 may monitor battery drain of the power source 29 (e.g., a battery) of the electronic device 10 (e.g., during certain intervals) and collect telemetry data from the various components that have contributed to the power drain. For example, the slow accounting engine 308 may monitor the battery drain over a one-hour period and collect the telemetry data of the display 18, the processor 12, the components of the network interface 26, and so on. By comparing the battery drain with the on-device telemetry 312, the slow accounting engine 308 may determine the amount of drain for which each component is responsible.

Further, the on-device telemetry 312 may enable the slow accounting engine 308 to determine the amount of energy consumption for which each client 202 is responsible. The slow accounting engine 308 may improve the determination of the slow energy usage 326 over time by correcting its output against the battery charge state provided by the battery charge detector 314 of the electronic device 10. The battery charge detector 314 may include an integrated circuit (IC) and/or software that records the drain on the power source 29 (e.g., a battery) of the electronic device 10. The slow accounting engine 308 may compare the energy drain estimated by the power model 310 against the battery charge state measured by the battery charge detector 314 and adjust the power models 310 to fit the energy drain measured by the battery charge detector 314. The large number of inputs and various corrective procedures of the slow accounting engine 308 may result in the slow accounting engine 308 providing the slow energy usage 326 in relatively long intervals (e.g., longer than every 30 minutes, longer than every 45 minutes, longer than every hour, and so on), resulting in a slow but accurate estimation of energy consumed (e.g., in the form of the slow energy usage 326) as a result of the background processes run by the clients 202.

Similar to the slow accounting engine 308, the fast accounting engine 302 may determine a fast energy usage 324 using power models that estimate the power consumed by background processes run by the clients 202. However, the fast accounting engine 302 may use fewer models, fewer inputs, and/or may forego certain time-consuming corrective procedures employed by the slow accounting engine 308 (e.g., the on-device telemetry 312 and correction against the battery charge state provided by the battery charge detector 314) to achieve a faster determination. For example, the fast accounting engine 302 may only employ models that estimate the energy consumed by certain components of the electronic device 10 that may consume a larger portion of the background process energy budget, such as the CPU model 304 and the network model 306. By estimating energy consumed by the clients 202 using fewer models, the fast accounting engine 302 may determine the fast energy usage 324 in shorter intervals (e.g., less than 1 minute, less than 5 minute, less than 10 minute, and so on) than the slow energy usage 326 determined by the slow accounting engine 308. The fast energy usage 324 provided at shorter intervals may enable the scheduler 206 to account for certain energy consumption changes that cannot be reported by the slow accounting engine 308 alone due to its longer processing and reporting time.

For example, if the client 2 202B executes a background process that uses excessive processing power, the slow accounting engine 308 may not factor the additional energy consumed by the client 2 202B into the slow energy usage 326 for a time period that is longer than 30 minutes, longer than 45 minutes, longer than one hour, and so on, because of the large number of models, inputs, and/or corrective measures that are used to determine the slow energy usage 326 Thus the scheduler 206 may not send a block signal 340 or a defer signal 338 to the client 2 202B during that time period. In the time between client 2 202B running and the scheduler 206 receiving the slow energy usage 326, the client 2 202B may have already consumed more energy than was allotted for the background processes by the budget modulator 322. However, as the fast accounting engine 302 uses fewer models and uses fewer or no corrective processes, the fast accounting engine 302 may quickly identify the increase in energy consumed by the client 2 202B and report (e.g., within the threshold of time less than that of the slow accounting engine 308, instantaneously, within one minute, within five minutes, within ten minutes, and so on) the increased energy usage to the scheduler 206 so that the scheduler may block or defer client 2 202B and any other clients running or requesting to run. While the CPU model 304 and the network model 306 are the only models shown as used by the fast accounting engine 302, it should be noted that these models 304 and 306 are merely exemplary, and the fast accounting engine 302 may use any of a variety of power models (e.g., a Wi-Fi model, a display model, an audio model, and so on). Further, the fast accounting engine 302 may only use one of these models, may use two models, or may use more than two models (e.g., three models, four models, five models, or more). Further, while no corrective procedures are illustrated for the fast accounting engine 302, in some embodiments, the fast accounting engine 302 may utilize at least some corrective procedures (e.g., on-device telemetry 312, correction against the battery charge state provided by the battery charge detector 314, or the like).

Figure 4:
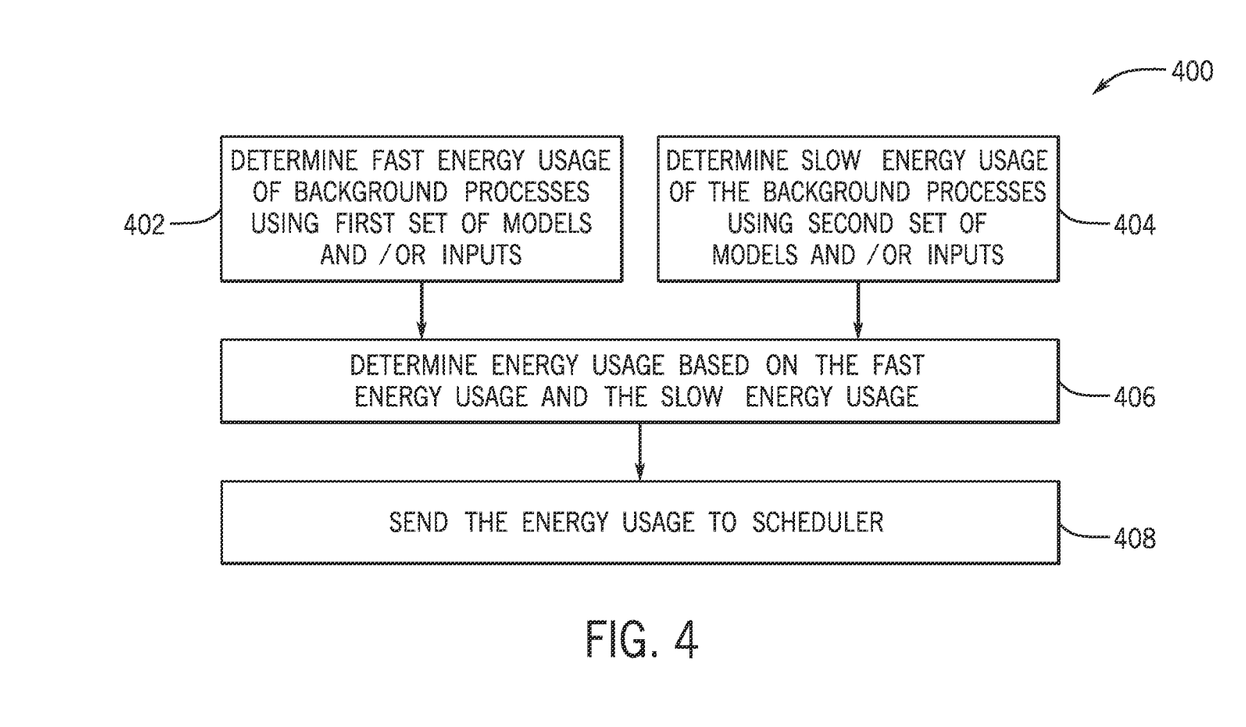
FIG. 4 is a flowchart of a method for determining the energy usage of the background processes as illustrated in FIG. 3, according to an embodiment of the present disclosure.

FIG. 4 is a flowchart of a method 400 for determining the energy usage of the background processes using the slow accounting engine 308 and the fast accounting engine 302, according to an embodiment of the present disclosure. Any suitable device (e.g., a controller) that may control components of the electronic device 10, such as the processor 12, may perform the method 400. In some embodiments, the method 400 may be implemented by executing instructions stored in a tangible, non-transitory, computer-readable medium, such as the memory 14 or storage 16, using the processor 12. For example, the method 400 may be performed at least in part by one or more software components, such as the operating system 204 of the electronic device 10, one or more software applications of the electronic device 10, and the like. While the method 400 is described using steps in a specific sequence, it should be understood that the present disclosure contemplates that the described steps may be performed in different sequences than the sequence illustrated, and certain described steps may be skipped or not performed altogether.

In process block 402, the fast accounting engine 302 may determine the fast energy usage 324 representing a first estimate of the energy usage of the background processes using a first set of models and/or inputs, as previously discussed in FIG. 3. In process block 404, the slow accounting engine 308 may determine the slow energy usage 326 representing second estimate of the energy usage of the background processes using a second set of models and/or inputs, as previously discussed in FIG. 3. As discussed above, the slow accounting engine 308 may also determine the slow energy usage 326 using one or more corrective techniques (e.g., based on using the on-device telemetry 312, the battery charge detector 314, or the like). In process block 406, the energy coalescing algorithm 316 may combine the fast energy usage 324 and the slow energy usage 326 and determine an energy usage 318 (e.g., an aggregate accounting of the total background process energy usage based on the fast energy usage 324 and the slow energy usage 326) of the background processes running on the electronic device 10. In process block 408, the energy coalescing algorithm 316 may send the energy usage 318 (as may be seen in FIG. 3) to the scheduler 206.

The frequency with which the energy coalescing algorithm 316 sends the energy usage 318 may vary depending on whether any significant changes in the energy usage 318 has occurred. That is, using a timestamp 328 associated with the fast energy usage 324 and a timestamp 330 associated with the slow energy usage 326, the energy coalescing algorithm 316 may determine a difference between the energy usage 318 at a first point in time (e.g., indicated by the timestamp 328) and the energy usage 318 at a second point in time (e.g., indicated by the timestamp 330). If the difference does not exceed an energy usage threshold, the energy coalescing algorithm 316 may not report the energy usage 318. However, if the difference does exceed the energy expenditure threshold, the energy coalescing algorithm 316 may report the energy usage 318 to the scheduler 206 which may, for example, block or defer the background processes run by the clients 202.

The energy usage 318 represents the total energy usage due to the background processes as determined by the energy coalescing algorithm 316 in process block 406. The energy usage 318 may be sent to the scheduler 206 as a single number representing the energy used by the background processes over the course of a day (or any other interval chosen). For example, the energy coalescing algorithm 316 may report the energy usage 318 as the energy consumed over the course of the day in mWh. In this manner, the method 400 determines the energy usage of the background processes using the slow accounting engine 308 and the fast accounting engine 302.

Figure 5:
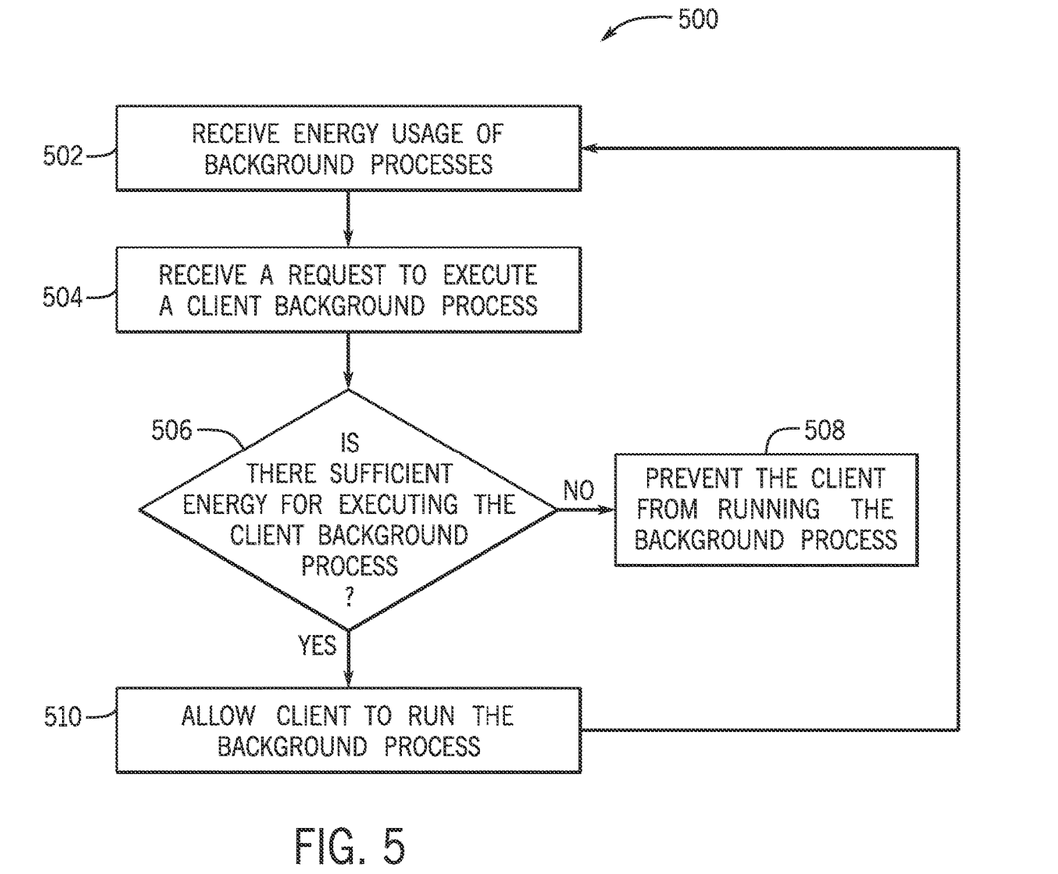
FIG. 5 is a flowchart of a method for managing client execution based on the energy usage determined by the method of FIG. 4, according to an embodiment of the present disclosure.

FIG. 5 is a flowchart of a method 500 for managing client execution (e.g., by the scheduler 206), according to an embodiment of the present disclosure. Any suitable device (e.g., a controller) that may control components of the electronic device 10, such as the processor 12, may perform the method 500. In some embodiments, the method 500 may be implemented by executing instructions stored in a tangible, non-transitory, computer-readable medium, such as the memory 14 or storage 16, using the processor 12. For example, the method 500 may be performed at least in part by one or more software components, such as the operating system 204 of the electronic device 10, one or more software applications of the electronic device 10, the scheduler 206, and the like. While the method 500 is described using steps in a specific sequence, it should be understood that the present disclosure contemplates that the described steps may be performed in different sequences than the sequence illustrated, and certain described steps may be skipped or not performed altogether.

In process block 502, the scheduler 206 receives the energy usage 318 of the background processes (the energy usage 318 based on the fast energy usage 324 and the slow energy usage 326, as determined in process block 406 in FIG. 4 and sent to the scheduler 206 in process block 408). In process block 504, the scheduler 206 receives a request (e.g., the start notifications 332 and 336) to execute a background process of a client 202. In decision block 506, the scheduler may determine if there is sufficient energy for executing the background process of the client 202 based on the energy usage 318 and the system energy budget 320.

As previously stated, the budget modulator 322 may allocate energy to be used by the background processes over regular intervals and may report the energy allocation to the scheduler 206. The scheduler 206 may then subtract the energy usage 318 from the system energy budget 320. If the scheduler 206 determines that the energy usage 318 is greater than or equal to the system energy budget 320 (e.g., such that the system energy budget 320 would be less than 0 mWh after subtracting the energy usage 318), then the scheduler 206 may determine that there is not sufficient energy to execute the background process and, in process block 508, the scheduler 206 may prevent the client 202 from running the background process. The scheduler 206 may prevent the client 202 from running the background process in a variety of ways. For example, if the client 2 202B has already been approved and is currently running a background process, the scheduler 206 may send the defer signal 338, causing the client 2 202B to pause running the background process. As a further example, if the client 3 202C has not yet requested to run a background process, or if the client 3 202C has requested but has not been approved by the scheduler 206, the scheduler 206 may send the block signal 340 to prevent the client 3 202C from executing the background process.

However, if the scheduler 206 determines that the energy usage 318 is less than the system energy budget 320 (e.g., such that the remaining the system energy budget 320 would be greater than or equal to 0 mWh after subtracting the energy usage 318), then the scheduler 206 may determine that there is sufficient energy to execute the background process and, in process block 510, the scheduler 206 may allow the client 202 to run the background process or to continue running the background process. At least in some embodiments, the scheduler 206 may send an allow or permit signal to the client 202 to allow the client 202 to run the background process. In this manner, the method 500 enables the scheduler 206 to determine whether to allow the clients 202 to run the background processes or prevent the clients 202 from running the background processes.

While in some embodiments the background processes are allowed to run or prevented from running based on the past energy usage, in certain embodiments the energy accounting system 208 may predict the expected energy usage 318 based on various parameters, such as the background processes currently running, the background processes expected to run (e.g., based on time of day, what other background processes are running, learned user behavior, and so on), or the like. Using the various parameters, the scheduler 206 may use a machine-learning algorithm to improve estimates of energy usage 318 over time by collecting information regarding specific workloads or specific conditions that may arise for a particular user (e.g., based on the learned user behavior). For example, a background process may frequently be used with another background process that triggers a high level of usage of a graphic processing unit (GPU) of the electronic device 10. Collecting and analyzing such data may enable the energy accounting system 208 to more accurately predict the energy usage 318, and thus may enable the scheduler 206 to prevent background processes from running before the background processes use excess energy.

Additionally, certain background processes may use significantly more energy than other background processes, and certain background processes may have a higher priority to the electronic device 10 or to the user of the electronic device 10. The scheduler 206 may use the machine-learning algorithm to establish a weighting metric for the background processes, such that the machine-learning algorithm may predict a greater energy usage from a first background process, while predicting little to no additional energy usage from a second background process. The scheduler 206 may then determine that the system energy budget 320 may be preserved by preventing the first background process from running while allowing the second background process to run. Further, the scheduler 206 may determine that, while the first background process has a greater energy usage 318, it may also have a higher priority to the electronic device (e.g., a background process for communicating with a cellular network) or to the user of the electronic device 10 (e.g., based on user input and/or user behavior), and thus allow the first background process to run despite its higher energy usage 318. This weighting hierarchy may enable the scheduler 206 to make more intelligent decisions as to background process management.

Figure 6:
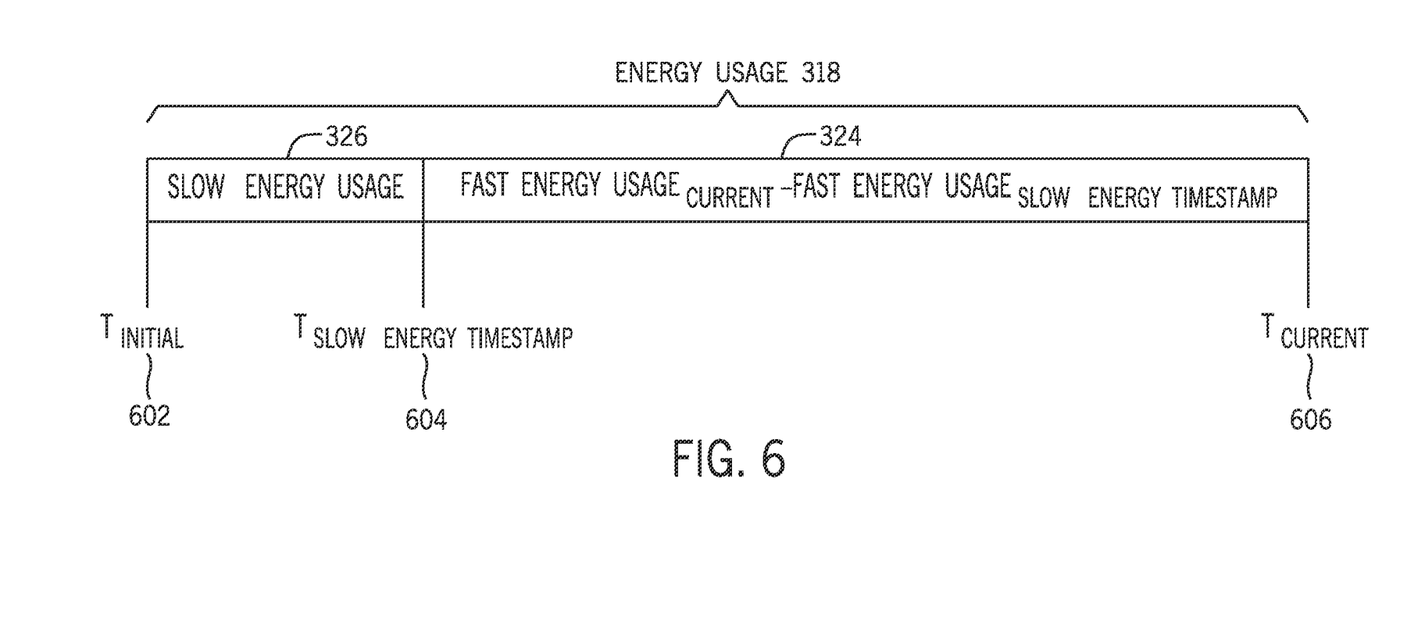
FIG. 6 is a timing diagram illustrating determining energy usage of the background processes using slow energy usage determined by a slow accounting engine and fast energy usage determined by a fast accounting engine of the energy accounting system of FIG. 3, according to an embodiment of the present disclosure.
Figure 7:
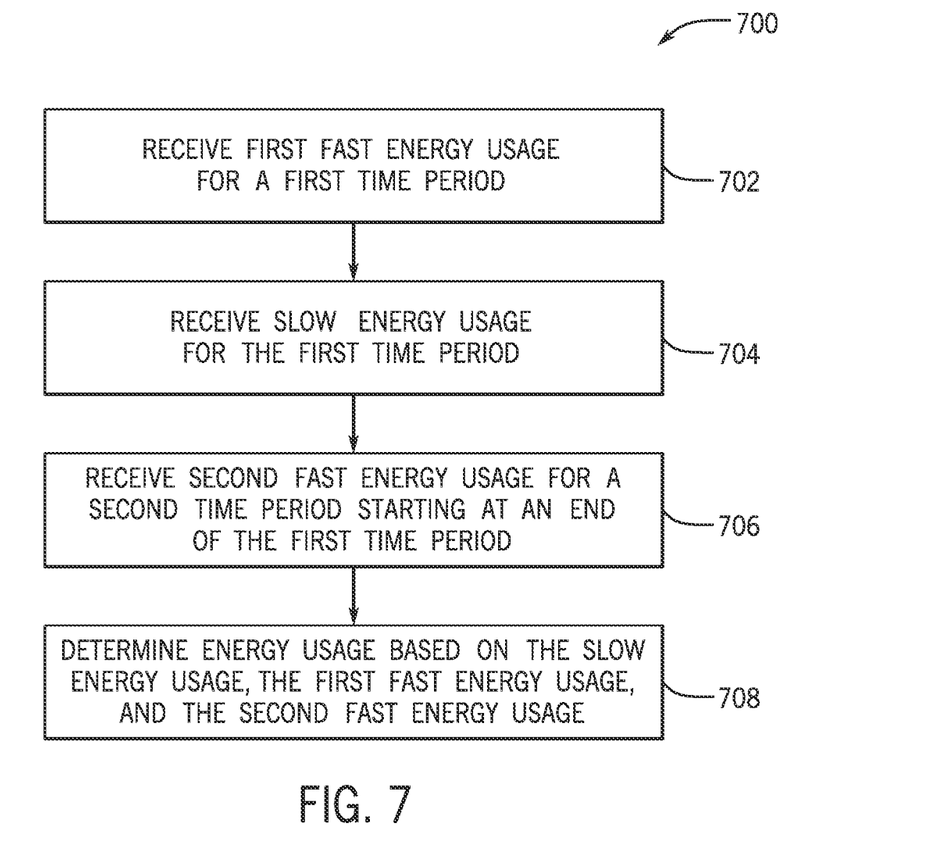
FIG. 7 is a flowchart of a method for determining the energy usage of the background processes as a function of time as illustrated in FIG. 6, according to an embodiment of the present disclosure.

FIG. 6 is a timing diagram illustrating determining the energy usage 318 based on the fast energy usage 324 and the slow energy usage 326, according to an embodiment of the present disclosure. FIG. 7 is a flowchart of a method 700 for determining the energy usage 318 over particular time periods indicated by a set of timestamps, according to an embodiment of the present disclosure. Any suitable device (e.g., a controller) that may control components of the electronic device 10, such as the processor 12, may perform the method 700. In some embodiments, the method 700 may be implemented by executing instructions stored in a tangible, non-transitory, computer-readable medium, such as the memory 14 or storage 16, using the processor 12. For example, the method 700 may be performed at least in part by one or more software components, such as the operating system 204 of the electronic device 10, one or more software applications of the electronic device 10, the energy accounting system 208, and the like. While the method 700 is described using steps in a specific sequence, it should be understood that the present disclosure contemplates that the described steps may be performed in different sequences than the sequence illustrated, and certain described steps may be skipped or not performed altogether.

In process block 702, the energy accounting system 208 receives a first fast energy usage 324 for the first time period. In particular, the energy accounting system 208 receives the fast energy usage 324 at the time indicated by the slow energy timestamp 604 (e.g., the most recent report of the slow energy usage 326) so that the energy accounting system 208 may account for any changes that occur between the last report of the slow energy usage 326 and the following report of the slow energy usage 326. The fast energy usage 324 at the time indicated by the slow energy timestamp 604 may also be input to the energy coalescing algorithm 316. In process block 704, the energy accounting system 208 receives the slow energy usage 326 for a first time period. In particular, the energy accounting system 208 receives the slow energy usage 326 and a slow energy timestamp 604, which may be input to the energy coalescing algorithm 316. The slow energy usage 326 may be determined from an initial time 602 to a time indicated by the slow energy timestamp 604. The initial time 602 may indicate the start of the energy budget allocation time period. For example, if the time period for the energy budget is one day, the initial time 602 may indicate the beginning of a 24-hour period. The slow energy timestamp 604 may indicate the most recent slow energy usage 326 that has been reported to the energy accounting system 208 (e.g., and input to the energy coalescing algorithm 316). In process block 706, the energy accounting system 208 receives a second fast energy usage for a second time period starting at an end of the first time period. In particular, the energy accounting system 208 receives the fast energy usage 324 at a current time 606. The fast energy usage 324 at the current time 606 may also be input to the energy coalescing algorithm 316.

In process block 708, the energy accounting system 208 may determine energy usage 318 based on the slow energy usage 326, the first fast energy usage (e.g., the fast energy usage received in the process block 704) and the second fast energy usage (e.g., the fast energy usage received in the process block 706). In particular, the energy coalescing algorithm 316 of the energy accounting system 208 combines the slow energy usage at the slow energy timestamp 604 with the difference between the fast energy usage 324 at the current time 606 and the fast energy usage 324 at the slow energy timestamp 604. By combining the fast energy usage 324 and the slow energy usage 326 as described in process block 708, the energy coalescing algorithm 316 may determine the energy usage 318 for the entire time period from the initial time 602 to the current time 606. In this manner, the method 700 enables the energy accounting system 208 to determine the energy usage 318 over particular time periods indicated by a set of timestamps. As described in process block 408 of FIG. 4, the energy usage 318 may then be sent to the scheduler 206, and as described in the method 500 of FIG. 5, the energy usage 318 may be used to manage the clients 212 and their background processes.

Figure 8A:
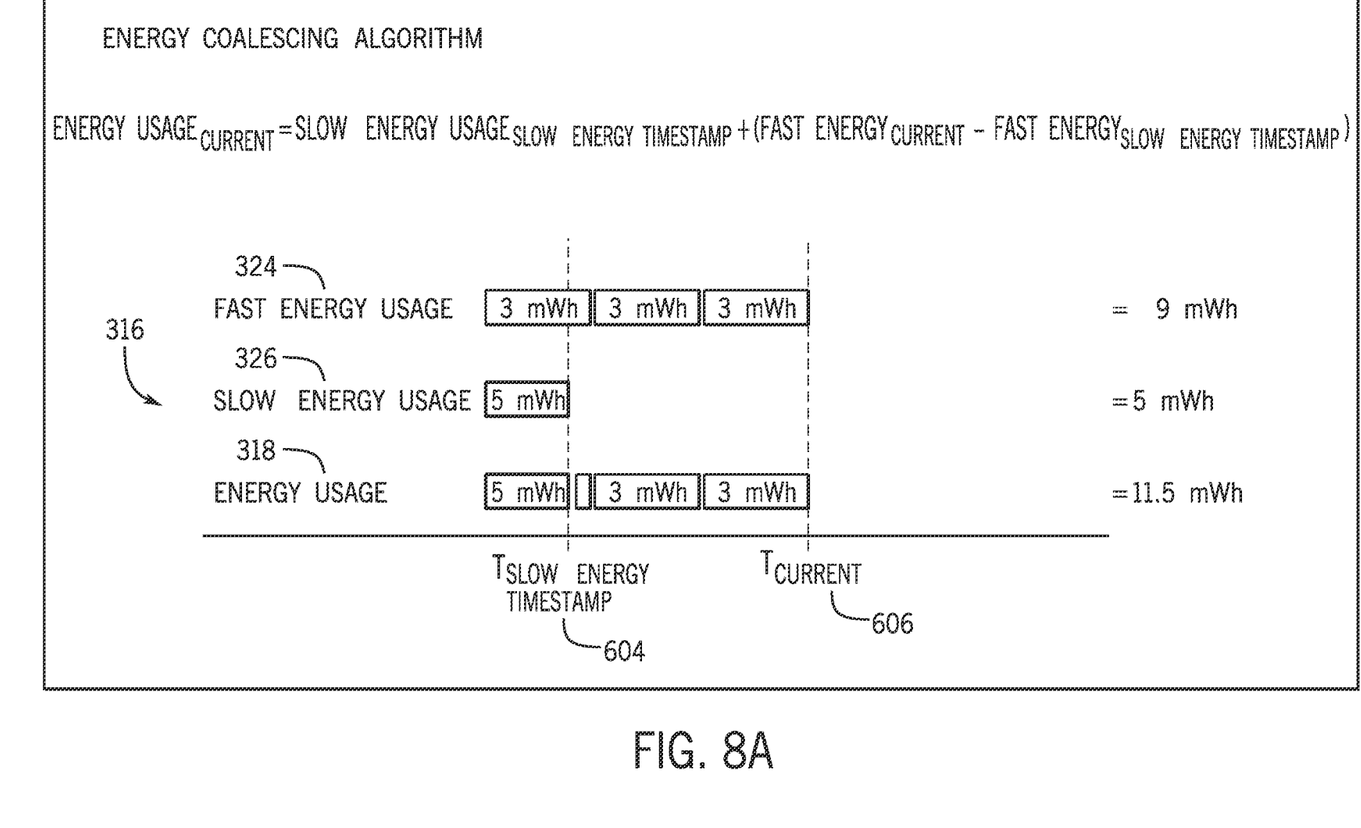
FIG. 8A is a timing diagram illustrating determining the energy usage of the background processes based on the fast energy usage and the slow energy usage for a first time period, according to an embodiment of the present disclosure.
Figure 8B:
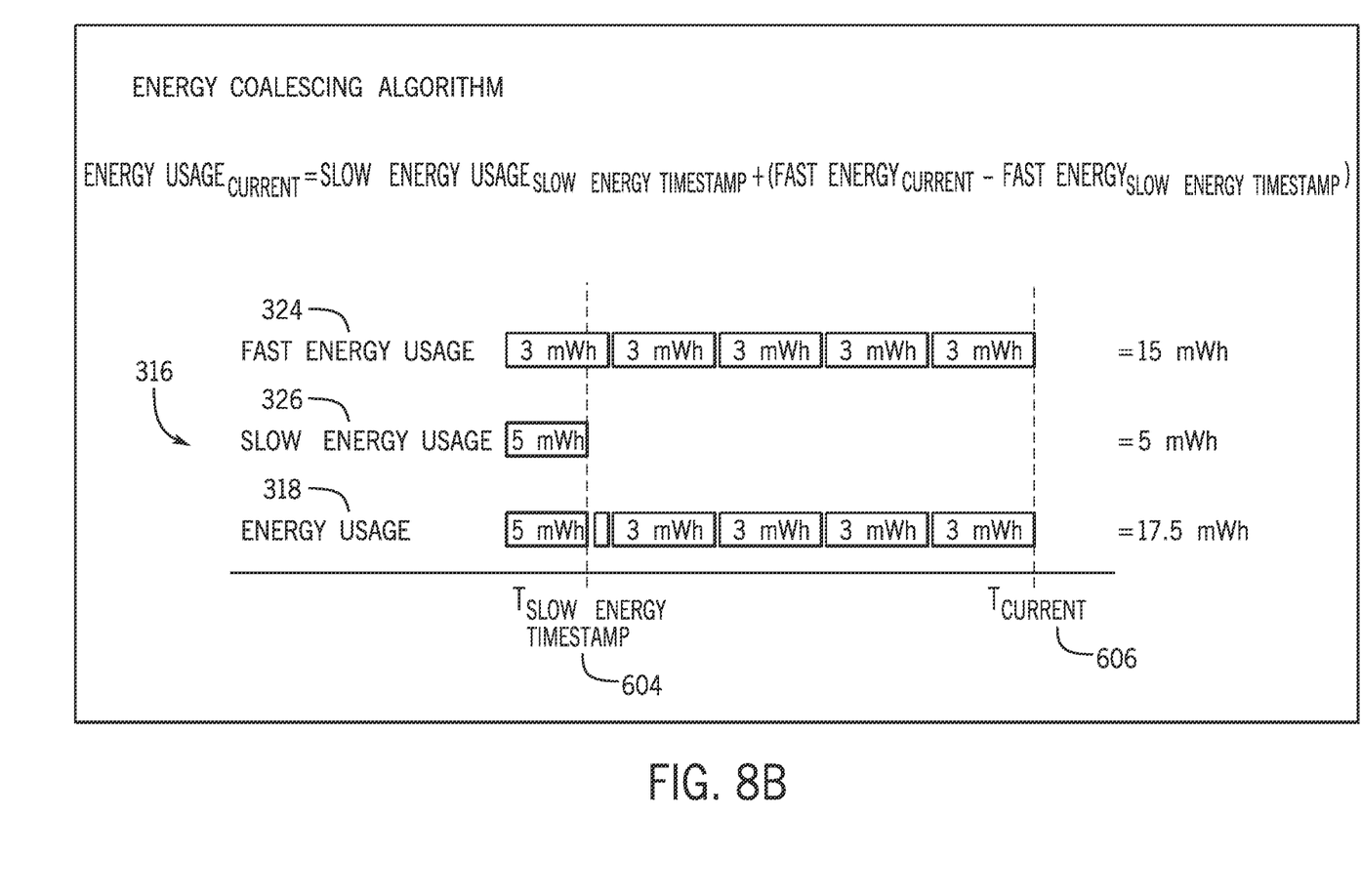
FIG. 8B is a timing diagram illustrating determining the energy usage of the background processes based on the fast energy usage and the slow energy usage for a second time period, according to an embodiment of the present disclosure.
Figure 8C:
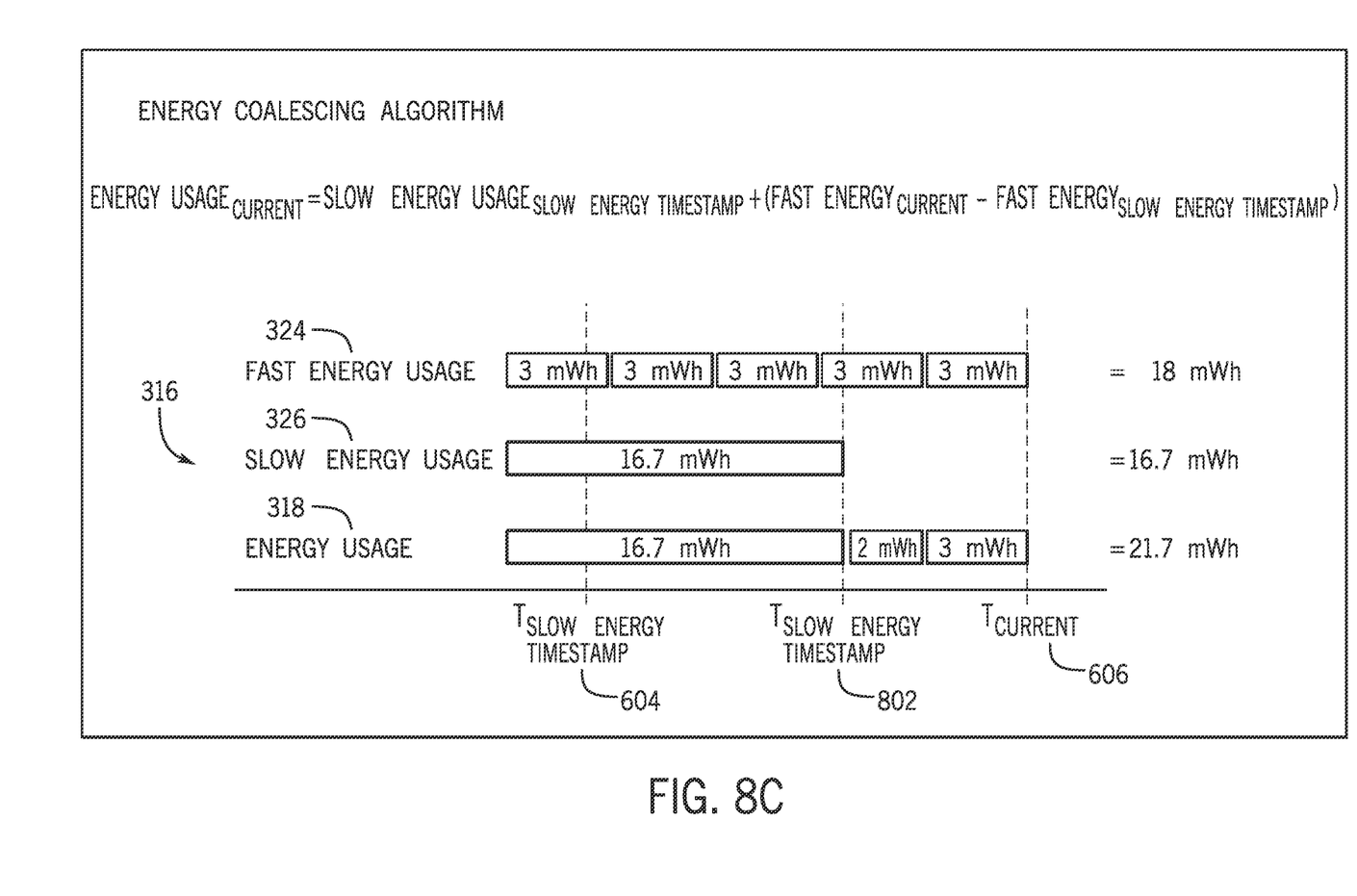
FIG. 8C is a timing diagram illustrating determining the energy usage of the background processes based on the fast energy usage and the slow energy usage for a third time period, according to an embodiment of the present disclosure.

FIGS. 8A-8C are timing diagrams that illustrate use cases of the energy coalescing algorithm 316 determining the energy usage 318 of the background processes executing on the electronic device 10 based on the fast energy usage 324 and the slow energy usage 326. In particular, FIG. 8A is a timing diagram illustrating determining the energy usage 318 based on the fast energy usage 324 and the slow energy usage 326 for a first time period, according to an embodiment of the present disclosure. In FIG. 8A, the fast energy usage 324 may report 9 mWh of energy usage from an initial time to a current time 606 (e.g., based on reporting 3 mWh for three blocks of time). As may be seen, the fast accounting engine 302 reports a fast energy usage of 2.5 mWh prior to the time indicated by the slow energy timestamp 604 and 6.5 mWh for the time period between the slow energy timestamp 604 and the current time 606. The slow accounting engine 308 reports a slow energy usage of 5 mWh from the initial time to a time indicated by the slow energy timestamp 604. The energy coalescing algorithm 316 may use the slow energy usage 326 for the most recent time period for which it is available (e.g., from the initial time to the time indicated by the slow energy timestamp 604) as the slow energy usage 326 may be more accurate than the fast energy usage 324 for the same time period, as was previously discussed. Thus the energy coalescing algorithm 316 may determine the energy usage 318 by combining the slow energy usage 326 that is available up until the slow energy timestamp 604 (e.g., 5 mWh) with the fast energy usage 324 for the remaining time between the slow energy timestamp 604 and the current time 606 (e.g., 6.5 mWh) to arrive at an energy usage 318 of 11.5 mWh.

FIG. 8B is a timing diagram illustrating determining the energy usage 318 based on the fast energy usage 324 and the slow energy usage 326 for a second time period, where the second time period is greater than the first time period of the diagram in FIG. 8A (e.g., corresponding a future time with respect to the first time period), according to an embodiment of the present disclosure. As may be seen in FIG. 8B, the time period between the current time 606 and the time indicated by the slow energy timestamp 604 is greater than the time period in FIG. 8A. However, not enough time has passed for the slow accounting engine 308 to update the slow energy usage 326, thus the energy coalescing algorithm 316 may combine the 5 mWh of the slow energy usage 326 with the 12.5 mWh of the fast energy usage 324 reported between the current time 606 and the slow energy timestamp 604 to determine the energy usage 318 of 17.5 mWh.

FIG. 8C is a timing diagram illustrating determining the energy usage 318 based on the fast energy usage 324 and the slow energy usage 326 for a third time period, where the third time period is greater than the second time period of the diagram in FIG. 8B (e.g., corresponding a future time with respect to the second time period), according to an embodiment of the present disclosure. As may be seen in FIG. 8C, sufficient time has passed that the slow accounting engine 308 has updated the slow energy usage 326 (e.g., at a second slow energy timestamp 802). Thus the energy coalescing algorithm 316 may combine the 16.7 mWh of the slow energy usage 326 from the initial time to the most recent slow energy time stamp (e.g., the second slow energy timestamp 802) with the 5 mWh of the fast energy usage from the second slow energy timestamp 802 to the current time 606 to determine the energy usage 318 of 21.7 mWh.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. One or more tangible, non-transitory, computer-readable media, comprising computer-readable instructions that, upon execution by one or more processors of an electronic device, cause the one or more processors to:
   determine a first estimate of an amount of energy consumed by a plurality of background processes for a first time period using a first set of resource usage inputs, a first set of models, or both;
   determine a second estimate of the amount of energy consumed by the plurality of background processes for a second time period using a second set of resource usage inputs that are greater in number than the first set of resource usage inputs, a second set of models that are greater in number than the first set of models, or both;
   determine an aggregate estimate of the amount of energy consumed by the plurality of the background processes based on the first estimate and the second estimate; and
   send the aggregate estimate to a dynamic activity scheduler.

2. The one or more tangible, non-transitory, computer-readable media of claim 1, wherein the second set of resource usage inputs comprise the first set of resource usage inputs, the second set of models comprise the first set of models, or both.

3. The one or more tangible, non-transitory, computer-readable media of claim 1, wherein the aggregate estimate corresponds to the amount of energy consumed by the plurality of the background processes from an initial time to a current time, where the first time period begins at the initial time, and the second time period ends at the current time.

4. The one or more tangible, non-transitory, computer-readable media of claim 1, wherein the instructions, upon execution by the one or more processors, cause the one or more processors to determine a third estimate of the amount of energy consumed by the plurality of background processes from an initial time to a current time, determine a fourth estimate of the amount of energy consumed by the plurality of background processes for the first time period, and determine the second estimate based on the third estimate and the fourth estimate.

5. The one or more tangible, non-transitory, computer-readable media of claim 4, wherein the instructions, upon execution by the one or more processors, cause the one or more processors to determine the second estimate by subtracting the fourth estimate from the third estimate.

6. The one or more tangible, non-transitory, computer-readable media of claim 1, wherein the second estimate is determined using on-device telemetry of a component, a subsystem, or both of the electronic device.

7. The one or more tangible, non-transitory, computer-readable media of claim 1, wherein the instructions, upon execution by the one or more processors, cause the one or more processors to compare the second estimate to a battery charge state provided by a battery charge detector of the electronic device.

8. The one or more tangible, non-transitory, computer-readable media of claim 1, wherein the instructions, upon execution by the one or more processors, cause the one or more processors to determine a first predictive estimate of the amount of energy expected to be consumed by the plurality of background processes for the first time period using the first set of resource usage inputs, the first set of models, or both, and to determine a second predictive estimate of the amount of energy expected to be consumed by the plurality of background processes for the second time period using the second set of resource usage inputs, the second set of models, or both.

9. The one or more tangible, non-transitory, computer-readable media of claim 8, wherein the instructions, upon execution by the one or more processors, cause the one or more processors to determine an aggregate predictive estimate of the amount of energy expected to be consumed by the plurality of the background processes based on the first predictive estimate and the second predictive estimate, and send the aggregate predictive estimate to the dynamic activity scheduler.

10. A system, comprising:
memory configured to store a plurality of client applications configured to execute background processes; and
processing circuitry configured to execute an operating system and the plurality of client applications, the operating system comprising:
   a fast energy accounting engine configured to determine a first energy usage estimate of the background processes for a first time period using a first set of resource usage inputs, a first set of models, or both; and
   a slow energy accounting engine configured to determine a second energy usage estimate of the background processes for a second time period using a second set of resource usage inputs that are greater in number than the first set of resource usage inputs, a second set of models that are greater in number than the first set of models, or both; and
   a dynamic activity scheduler configured to, based on the first energy usage estimate and the second energy usage estimate, allow the plurality of client applications to execute the background processes or prevent the plurality of client applications from executing the background processes.

11. The system of claim 10, wherein an energy accounting system comprises the fast energy accounting engine, the slow energy accounting engine, and an energy coalescing algorithm configured to determine the energy usage of the background processes based on the first energy usage estimate and the second energy usage estimate, and send the energy usage to the dynamic activity scheduler.

12. The system of claim 11, wherein the energy accounting system is configured to determine a third energy usage estimate of the background processes from an initial time to a current time and determine a fourth energy usage estimate of the background processes for the first time period, and determine the second energy usage estimate based on the third energy usage estimate and the fourth energy usage estimate.

13. The system of claim 12, wherein the energy accounting system is configured to determine the second energy usage estimate by subtracting the fourth energy usage estimate from the third energy usage estimate.

14. The system of claim 10, wherein the dynamic activity scheduler comprises a budget modulator configured to allocate an amount of energy to an energy budget for use by the background processes, and the dynamic activity scheduler is configured to determine a remaining portion of the energy budget based at least on a difference between the energy budget and the energy usage determined by an energy accounting system.

15. The system of claim 14, wherein the dynamic activity scheduler blocks, in response to determining that the remaining portion of the energy budget is less than zero, a client application of the plurality of client applications from running a respective background process.

16. The system of claim 14, wherein the dynamic activity scheduler causes, in response to determining that the remaining portion of the energy budget is less than zero, a currently-running client application of the plurality of client applications to defer running a respective background process until a later time.

17. The system of claim 14, wherein the dynamic activity scheduler allows, in response to determining that the remaining portion of the energy budget is greater than or equal to zero, a client application of the plurality of client applications to begin running a respective background process or continue to run the respective background process.

18. The system of claim 14, wherein the amount of energy allocated to the energy budget comprises a fixed, predetermined amount of energy.

19. A method, comprising:
receiving a first estimate of an amount of energy consumed by a plurality of background processes for a first time period using a first set of resource usage inputs, a first set of models, or both;
receiving a second estimate of the amount of energy consumed by the plurality of background processes for the first time period using a second set of resource usage inputs that are lesser in number than the first set of resource usage inputs, a second set of models that are lesser in number than the first set of models, or both;
receiving a third estimate of the amount of energy consumed by the plurality of background processes for a second time period starting from an end of the first time period using the second set of resource usage inputs;
determining an aggregate estimate of the amount of energy consumed by the plurality of the background processes based on the first estimate, the second estimate, and the third estimate; and
managing the plurality of background processes based on the aggregate estimate.

20. The method of claim 19, wherein the aggregate estimate indicates energy consumed by the plurality of background processes from an initial time to a current time.

* * * * *